Oct. 3, 1967    J. I. RUSSO    3,344,450
APPARATUS FOR THE AUTOMATIC MANUFACTURE OF PIPE UNIONS
Filed July 15, 1965    8 Sheets-Sheet 1
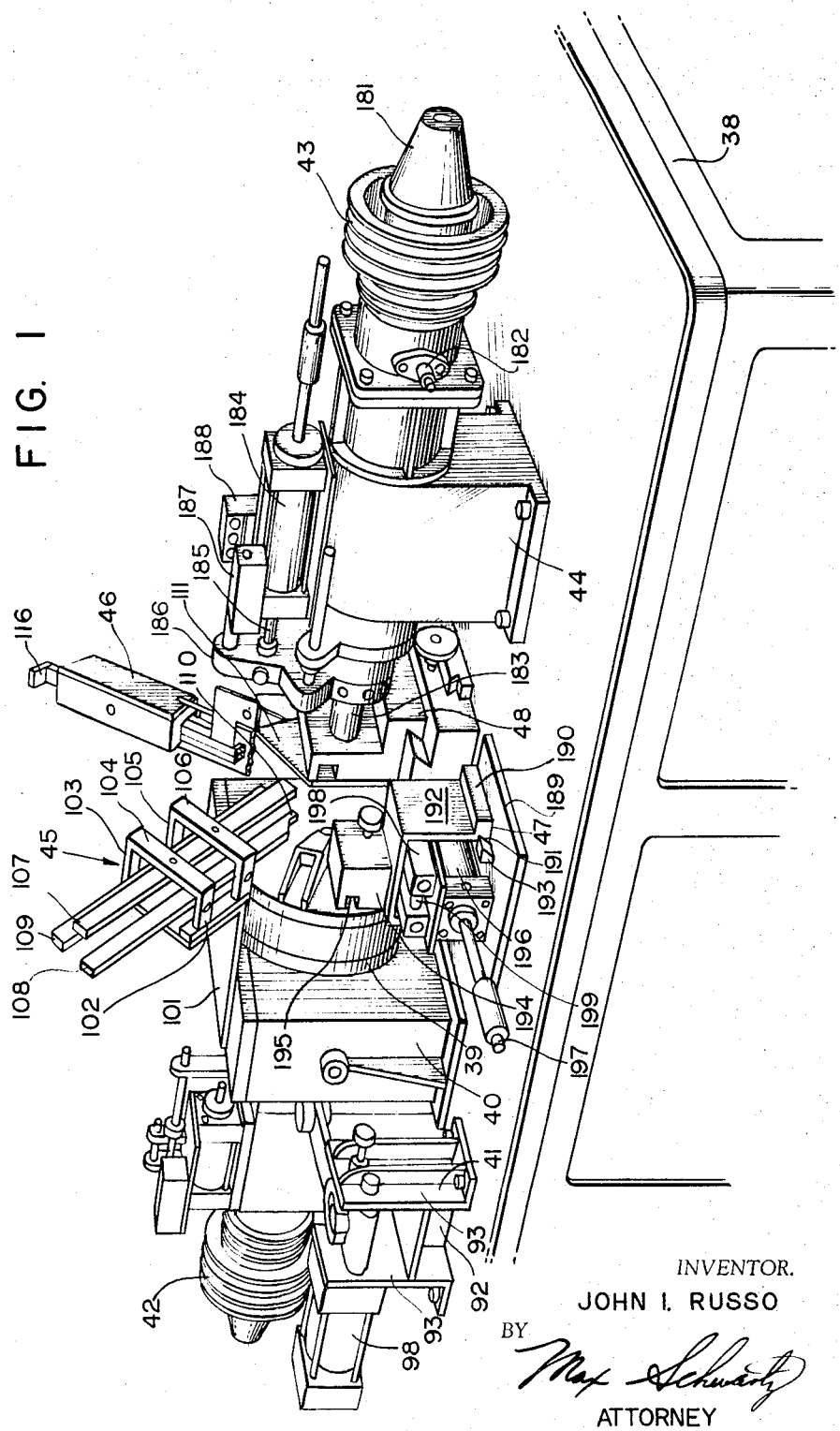
INVENTOR.
JOHN I. RUSSO
BY
Max Schwartz
ATTORNEY

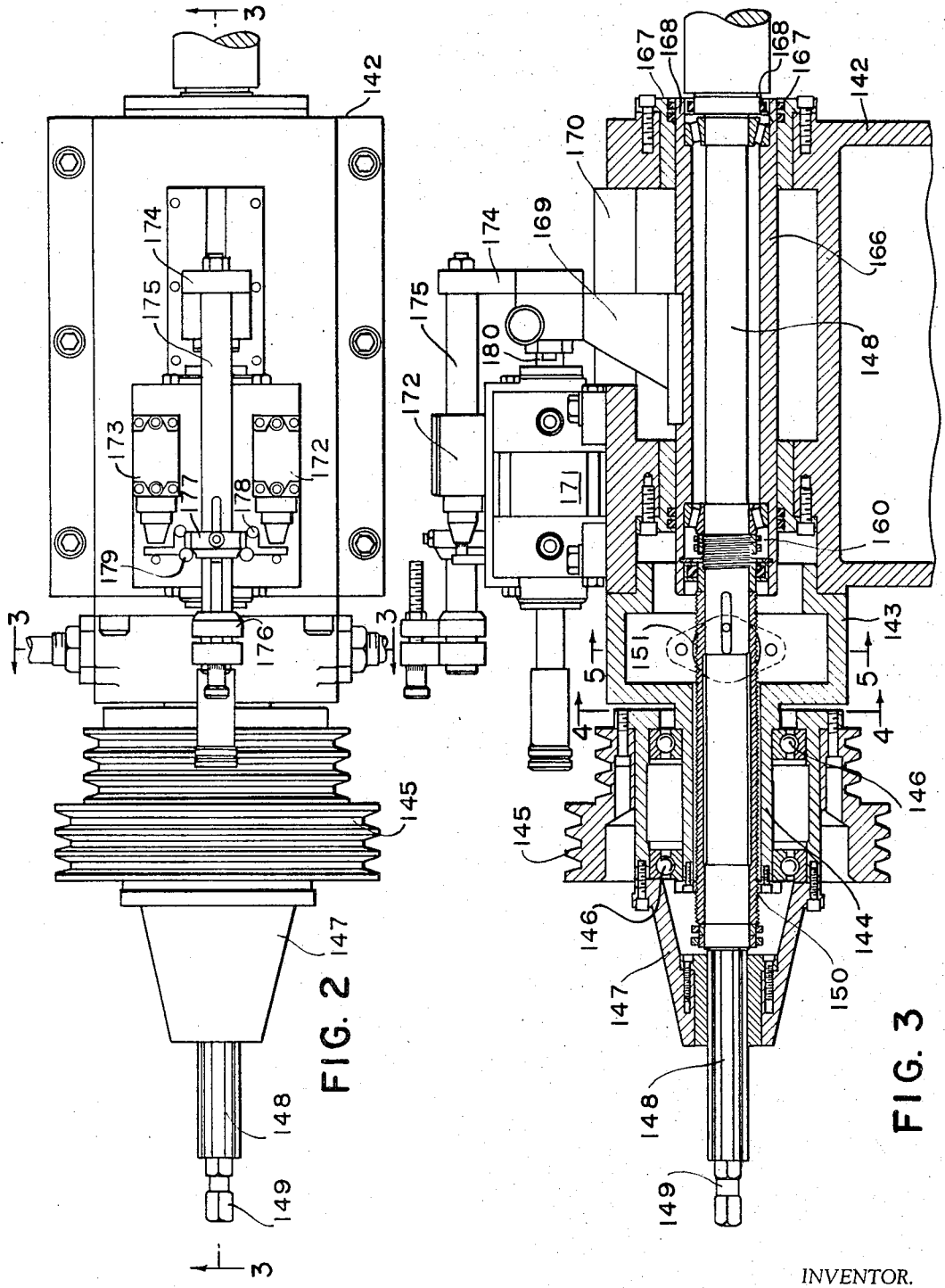

INVENTOR.
JOHN I. RUSSO

Oct. 3, 1967 J. I. RUSSO 3,344,450
APPARATUS FOR THE AUTOMATIC MANUFACTURE OF PIPE UNIONS
Filed July 15, 1965 8 Sheets-Sheet 6

INVENTOR.
JOHN I. RUSSO
ATTORNEY

INVENTOR.
JOHN I. RUSSO
BY
ATTORNEY

3,344,450
APPARATUS FOR THE AUTOMATIC MANUFACTURE OF PIPE UNIONS
John I. Russo, Cranston, R.I., assignor of one-half to Frank A. Ronci, Providence, R.I.
Filed July 15, 1965, Ser. No. 472,247
50 Claims. (Cl. 10—87)

My present invention relates to pipe unions, and more particularly to a novel apparatus for the automatic manufacture of the parts thereof.

The principal object of the present invention is to provide a single apparatus which will perform all the necessary operations for the manufacture of a pipe union.

Another object of the present invention is to provide an apparatus capable of performing the various operations for the manufacture of a pipe union, and which can be operated with the manual control of each operation, or programmed for automatic operation.

A further object of the present invention is to provide an apparatus for the manufacture of pipe unions which performs the several operations necessary for such manufacture from a single position, the blank for the pipe unions being fed from a hopper to the apparatus.

Another object of the present invention is to provide an apparatus for the automatic manufacture of pipe unions in which the exterior and interior portions of the union can be machined, either in sequence or simultaneously, at a single station of the machine.

A further object of the present invention is to provide an apparatus for the manufacture of pipe unions which is designed to bring tools to bear on the union blank from four different directions.

Another object of the present invention is to provide an apparatus for the automatic manufacture of pipe unions which is comparatively simple in construction and easy and economical to manufacture and assemble.

With the above and other objects and advantageous features in view, my invention consists of a novel arrangement of parts, more fully disclosed in the detailed description following, in conjunction with the accompanying drawings, and more particularly defined in the appended claims.

In the drawings,

FIG. 1 is a perspective view of an apparatus embodying my present invention.

FIG. 2 is a top plan view of the rear spindle.

FIG. 3 is a section taken on line 3—3 on FIG. 2.

Pipe unions comprise two major portions, a tail or socket portion and a swivel or ball portion. With the parts fitted together, a simple threaded collar is used to make the joinder. However, these main sections are each formed by performing various machine operations on a rough casting. The casting must be machined to proper size inside and out and threaded where necessary. If the union is to be sweated into place then the inside must be reamed. A pipe union is a fairly simple item and it is essential that in spite of the plurality of the machine operations performed on each piece, that the price be fairly reasonable. The present invention is designed to provide an apparatus which performs all the machine operations on each piece automatically. The machine of the present invention can readily be set up for a manual control of each operation or for performing the operations in series with an overall electrical control device.

Figure 10:
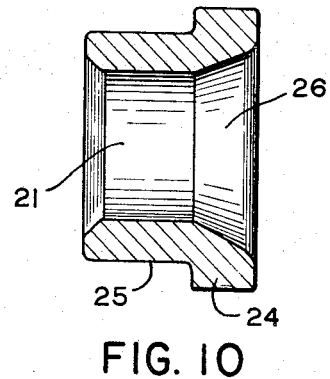
FIG. 10 is a view similar to FIG. 9 showing the blank after the first series of operations performed by the apparatus.
Figure 11:
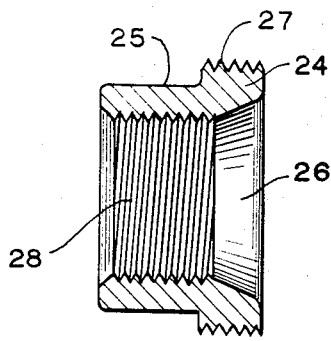
FIG. 11 is a view similar to FIGS. 9 and 10 showing the completed tail portion of the union.
Figure 13:
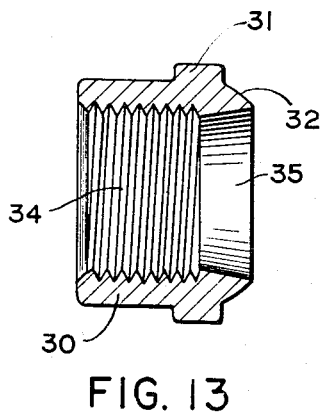
FIG. 13 is a view similar to FIG. 12 showing the blank after the performance of several operations by the apparatus.
Figure 14:
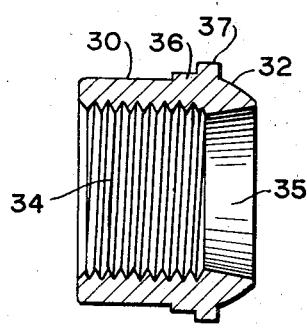
FIG. 14 is a view similar to FIGS. 12 and 13 showing the complete swivel union portion.

Basically, the apparatus of the present invention forms the tail piece of a union shown in FIG. 11 and the swivel piece of the union shown in FIG. 14. The tail piece shown in FIG. 11 is formed from a blank shown in FIG. 9 and passes through steps shown in FIG. 10 and the swivel piece shown in FIG. 14 is formed from a blank shown in FIG. 12 and passes through steps shown in FIG. 13.

Figure 9:
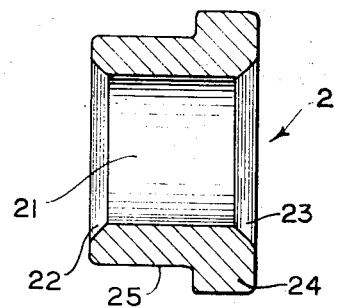
FIG. 9 is a vertical section of the blank for forming the tail portion of the union.

Now referring to FIGS. 9 to 11 inclusive, the tail or socket piece is formed from a blank 20 which is roughly cast or forged having a central opening 21 flaring slightly outwardly at 22 at one end and further at 23 at the other end. At the flared end 23, the blank 20 is provided with an enlarged collar portion 24 of larger diameter than the body 25. The body portion 25 is usually made with an outside octagonal surface for receiving a pipe wrench.

In the machine of the present invention the blank 20 shown in FIG. 9 is loaded into a magazine or chute. It is then picked up and inserted between the jaws of a chuck which firmly grasps the octagonal portion 25. The chuck starts rotating and a tool slides transversely towards the blank for machining the outer surface of the collar 24. Simultaneously another tool slides transversely from the opposite side at the required angle and finishes the tapered surface 26. The chuck now stops rotating and a spindle slides forwardly at the front to form the threaded portion 27 on the outside of the collar 24. Simultaneously, another tool slides axially through the chuck to form the internal threads 28 where required. In some instances it is desired to "sweat" or solder the union into position. In such cases the tool sliding axially, which forms the thread 28, is changed to a reaming tool instead which reams the interior 21 to the required diameter.

Figure 12:
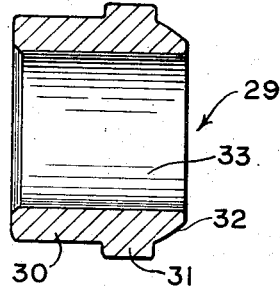
FIG. 12 is a vertical section of the blank for forming the swivel portion of the union.

The swivel or ball section is formed from a blank 29 shown in FIG. 12. With the proper tooling, the same machine illustrated herein forms both portions of the union. The blank 29 is also formed with an outer diameter 30 of octagonal construction for receiving a pipe wrench. At the forward end the diameter 30 is provided with an annular enlarged diameter portion 31 and a rounded portion 32 which forms a rough ball end tapering to the inside diameter 33. The blank 29 is also loaded in the magazine or chute and then picked up and positioned between the jaws of the chuck as in the previous form. In the next operation, illustrated in FIG. 13, the chuck does not rotate. A tool enters axially through the chuck and forms the threads 34, or reams the inside diameter if it is to be "sweated." Simultaneously, a tool moves to the front and roughs out the ball portion 32 and partly machines the major diameter portion 31. The inside surface of the ball portion, at 35, is also finished by the front tool in this operation. After the tools are retracted, the chuck begins to rotate and the transverse tools slide inwardly. One tool finishes off the outside diameter 36, and the other tool finishes off the major diameter 37 which forms a shoulder with the smaller diameter 36. This tool also finishes the ball 32.

Both portions of the union can therefore be made to be either threaded or sweated to the pipes. The ball end 32 of the swivel member shown in FIG. 14 is inserted into the tapered portion 26 of the tail member shown in FIG. 11. A collar (not shown) surrounding the swivel member 14 is provided with a shoulder which engages the flange 37 and also engages the threads 27 on the tail member to lock the parts together in a conventional manner.

The machine of the present invention therefore provides a chuck for gripping the blanks of either FIG. 9 or FIG. 12, feeding means along a chute together with an inserting element for moving the blanks one at a time from the chute into the chuck, a spindle operable through the chuck for performing the threading or reaming operations, a spindle in the front for performing the machine operations from the front, and a pair of transverse tools movable towards the chuck from each side of the machine, one of the tools being angularly adjustable to form the proper angle on the chamfer portion 26 of the tail member.

FIG. 1 is a perspective view of a machine embodying the present invention for performing the above operations. The machine is illustrated as mounted on a table 38 and comprises the chuck 39 mounted on its gear drive box 40 and controlled by the device 41. To the rear of the chuck is a spindle drive 42 which drives the threading or reaming operation through the chuck. In front is the spindle drive 43 mounted on the support 44 for advancing and retracting the tools in the front of the chuck. Angularly disposed in front of and above the chuck is the chute 45 at one side and the inserting mechanism 46 on the other side. Below these and forwardly of the chuck are a pair of transverse tools, the tool advancing and retracting device 47 on one side and the tool retracting and advancing device 48 on the opposite side, the device 48 being also angularly adjustable with respect to the plane of the chuck.

Figure 6:
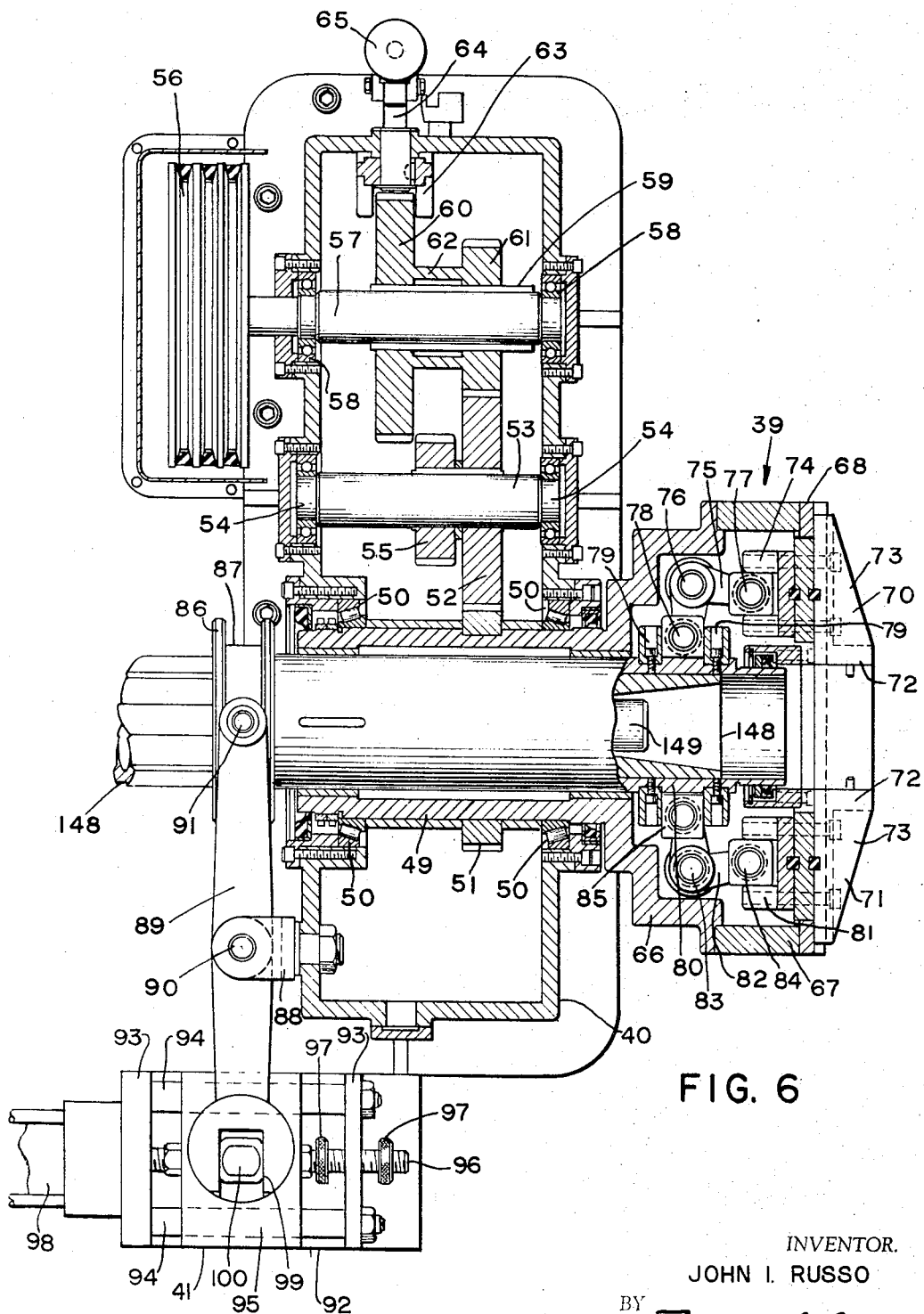
FIG. 6 is a horizontal section through the chuck and the chuck gear drive assembly.

Referring to FIG. 6, the chuck 39 is provided with a rearwardly extending hollow portion 49 rotatably mounted in bearings 50 in the gear drive housing 40. The portion 49 is rotated by a ring gear 51 mounted on the outside of the portion 49. The gear 51 is rotated by a gear 52, mounted on a shaft 53, in spaced parallel relation to the member 49 within the housing 40. The shaft 53 is mounted at each end in bearings 54. Also mounted on the shaft 53 is a smaller gear 55. This permits speed change of the rotation of the chuck as hereinafter described.

The chuck 39 is separately powered from any suitable unit with a belt drive connection to the wheel 56 mounted to the rear and one side of the gear drive housing 40. The wheel 56 is directly connected to a shaft 57 mounted parallel to the shaft 53 in bearings 58. The shaft 57 is splined, at 59, and slidably mounted thereon are a pair of gears 60 and 61 connected to each other by a central collar 62. The gear 61 is much smaller in diameter than the gear 60, as illustrated. As can readily be seen in FIG. 6, the spacing between the gears 60 and 61 represented by the collar 62 is greater than the width of the gear 55 so that when the gear 61 meshes with the gear 52 to drive the same, the gear 60 is out of alignment with the smaller gear 55.

With the parts positioned as described, the drive is from the belt 56 through the shaft 57, gear 61, driving the gear 52, driving the gear 51, and driving the member 49. Since the driving gear 61 is smaller than the driven gear 52, the chuck will rotate at a comparatively slow speed. To change gears to an increased speed, I provide a U-shaped member 63 mounted on a lever 64 having a handle 65 outside of the housing 40. The gear 60 fits easily and loosely between the arms of the U-shaped portion 63. When the lever 65 is moved to the left in FIG. 6, the U-shaped member 63 will move the gear 60, collar 62 and gear 61, along the spline 59 to the right, so that the gear 61 disengages from the gear 52, while the gear 60 now engages the smaller gear 55. Since the drive is now from the large gear 60 to the small gear 55, the rotation of the chuck 39 will be greatly increased.

Figure 7:
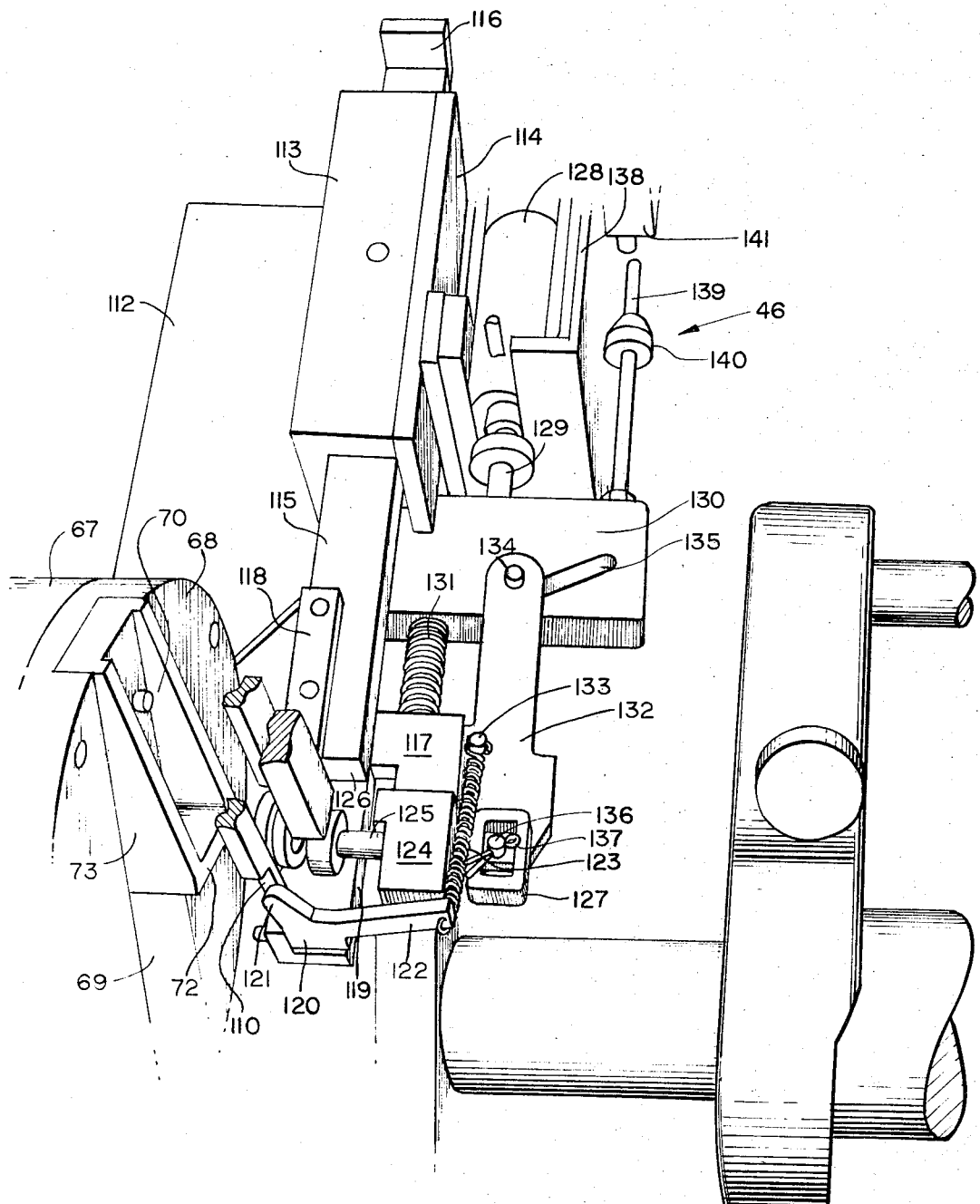
FIG. 7 is an enlarged perspective view of the front of the chuck showing the blank inserting mechanism.

As can be seen in FIG. 6, the chuck 39 is substantially hollow so that the operating mechanism for the jaws can be housed therein. The rotatable collar portion 49 flares outwardly at the front end at 66 and mounted thereon is a cylindrical wall portion 67. The front of the chuck, see FIGS. 6 and 7, is covered by a plate 68 having a channel 69 extending across a diameter. The jaws 70 and 71 are slidably mounted in the channel 69 and are designed to slide in opposite directions to each other so that when they move towards each other they will grip the work therebetween. Each jaw is provided with an integral vertical gripping portion 72 tapering rearwardly at each side at 73 to provide strength and rigidity.

Movement of the jaws is controlled by the construction shown in FIG. 6. Mounted on the jaw 70, and extending into the chuck, is a U-shaped member 74. A bell crank lever 75 is pivotally mounted in the chuck at 76, with one arm having a rectangular bearing portion 77 extending between the U-shaped arms of the member 74. The other arm of the bell crank lever is provided with a rectangular bearing 78 which rides between a pair of annular channel members 79 mounted in spaced relation on a collar 80. The other jaw 71 is similarly provided with a U-shaped member 81, and a second bell crank lever 82 is pivoted in the chuck at 83 with one arm provided with a bearing 84 mounted between the arms of the member 81, and the other arm of the bell crank lever 83 having a bearing 85 also mounted between the channel membres 79 mounted on the collar 80.

With the above construction, it is obvious that when the collar 80 moves to the right in FIG. 6, the channel members 79 push the bearing 78 to the right, pivoting the bell crank lever 75 counterclockwise, and causing the bearing 77 to move the U-shaped member 74 upwardly which moves the jaw 70 upwardly away from the center of the chuck. Simultaneously, the channels 79 move the bearing 85 to the right, which pivots the bell crank lever 82 clockwise. This causes the bearing 84 to move the member 81 downwardly which in turn moves the jaw 71 downwardly away from the center so that the jaws 70 and 71 move apart. Conversely, movement of the collar 80 to the left in FIG. 6, pivots the bell crank lever 75 clockwise and the bell crank lever 82 counterclockwise to move the jaws towards each other to grip the work inbetween.

Sliding movement of the collar 80 is controlled by the mechanism illustrated in FIGS. 1 and 6. The collar 80 extends rearwardly through the chuck collar portion 49 and through the housing 40, terminating at the rear in spaced parallel members 86 which form a channel 87 between them transversely of the collar 80. Mounted in back of the housing 40 is a stud 88 on which a lever 89 is pivotally mounted at 90. The lever 89 is mounted transversely to the collar 80 with its front end provided with a roller bearing 91 extending between the members 86 into the channel 87.

Movement of the lever 89 is controlled by the mechanism 41 mounted on the table 38 adjacent the machine as illustrated in FIGS. 1 and 6. A rectangular base 92 is provided with rectangular vertical end walls 93, having spaced parallel rods 94 extending therebetween. A block 95 is reciprocably mounted on the rods 94, which extend through openings in the block as shown in dotted lines in FIG. 6. In the position illustrated, the block 95 will slide along the rods 94 parallel to the collar 80. From the rear end of the block 95, a threaded bar 96 extends through the adjacent wall 93 and is provided with adjustable stop members 97, on each side of the wall, to adjustably limit the reciprocation of the block 95. The other end of the block 95 is attached to the piston of a cylinder 98.

Now, the near end of the lever 89 extends over the block 95 and is provided with a cut out rectangular slot 99, which surrounds a bearing post 100 on the block 95. Now as the cylinder 98 is actuated, its piston will cause reciprocation of the block 95 and its post 100. This moves the lever 89 through the slot 99. As this end of the lever 89 moves to the right in FIG. 6, it causes the opposite end to move to the left and pull the collar 80 to the left causing a clamping action in the jaws 70 and 71. Conversely, when the block 95 moves towards the left, the end with the bearing 91 pushes the collar 80 towards the right, which opens the jaws 70 and 71.

Operation of the cylinder 98, and therefore the opening and closing of the jaws 70 and 71 are easily synchronized and controlled with the insertion and the operation upon the blanks 20 or 29 as hereinabove described. With the jaws 70 and 71 apart and the mechanism at rest, the first step would be the feeding and insertion of one of the blanks 20 or 29 between the jaws and then the clamping of the jaws upon the octagonal sides of the blanks.

Feeding of the blanks is accomplished by the chute 45 and feeding device 46 more particularly illustrated in FIGS. 1 and 7. The chute 45 is supported by a horizontal plate 101 extending from the top of the housing 40. The outer end of the plate 101 is bent at right angles to the plate 101, but extends at an angle of about 50° to the axis of the spindle. Extending laterally from the plate 102 adjacent each side edge are side bars 103 connected at their ends by a cross bar 104 to define a rectangular opening. Aligned with this rectangular opening and spaced below it is a second rectangular opening defined by similar side bars 105 and the front cross bar 106. The chute is formed by three, spaced, parallel rectangular rods 107, 108 and 109. The rod 107 is supported by the front bars 104 and 106, extending inside of them as shown in FIG. 1. The bars 108 and 109 are each supported on one of the side bars 103 and 105. They may be fastened by bolts, screws or any other means. Since the rods 107, 108 and 109 are of rectangular cross section they will present opposed flat faces to each other. The spacing is such that the rear octagonal portions of the blanks will loosely fit between the rods 108 and 109 and the front of the blanks 20 or 29 will bear against the rod 107. A plurality of blanks may be thus inserted along the lengths of the rods to permit a substantially continuous feeding.

Referring to FIG. 1, the lower end of the rod 108 is provided with a finger extending portion 110 for cooperation with the inserting device 46. Adjacent the housing 40, on the far side of the machine as viewed in FIG. 1, is a generally U-shaped support 111 having a supporting plate 112 (see FIG. 7) extending rearwardly from the top edge thereof. Now referring to FIG. 7, an elongated generally U-shaped member 113 is mounted on the plate 112 with the opening of the slot facing to one side, to the right in FIG. 7. The open U-shaped portion is closed by a plate 114 to form an enclosed housing. An elongated rod 115, of rectangular cross section, is slidably mounted in the U-shaped member 113 with the upper end of the rod having a small vertical portion 116 which forms a limit stop for its downward motion towards the chuck. I now provide a generally rectangular plate 117 having a strap portion extending below the lower end of the rod 115 and around the rod so that it is bolted thereto at 118. The plate 117 is provided with a depressed socket portion 119 which is in the path of movement of the blanks leaving the bottom of the chute 45 to receive the lowermost blank.

Pivotally mounted at the front edge of the plate 117 is a blank holding member 120 having an upwardly extending finger portion 121 which engages the finger 110 at the end of the rod 108 of the chute when the rod 115 is in its withdrawn position. The member 120 has a portion 122 extending towards the right in FIG. 7 from which a spring 123 extends rearwardly to the back edge of the plate 117. The member 120 is therefore pivoted on its hinge against the socket portion 119 to yieldingly hold the blanks in the socket portion. However, the finger 110 at the end of the rod 108 holds the member 120 out against the action of the spring to allow the blanks to slide loosely into the socket portion in this position.

Mounted on the right edge of the plate 117 is a block 124 having a plunger 125 extending transversely thereto. The left end of the plunger 125 is provided with a head 126 which engages the blanks in the socket and moves them to the left. The right end of the plunger 125 is provided with a rectangular loop 127. Now mounted adjacent the plate 114 is a hydraulic cylinder 128 whose piston 129 is attached to the edge of an elongated rectangular plate 130, which is slidably mounted in the side of the rod 115. The space between the bottom edge of the plate 130 and the top edge of the plate 117 is filled by a strong coil spring 131. A lever 132 is pivoted at 133 to the side of the plate 117. The upper end of the lever 132 is provided with a stud 134 which extends into a slot 135 in the plate 130. The slot 135 extends at a slight upward angle of approximately 23°. The lower end of the lever 132 is provided with a stud 136 which extends upwardly into the loop 127 at the right end of the plunger 125. A cotter pin 137 locks the stud to the loop.

With the parts assembled as hereinabove described, the lowermost blank in the chute 45 drops into the socket portion 119. At this point the cylinder 128 is actuated so that its piston 129 moves the rod 115 and its associated plates 117 and 130 downwardly at an angle towards the center of the chuck 39. This downward motion continues until the back stop portion 116 of the rod 115 engages the top edge of the U-shaped housing portion 113. This positions the blank directly opposite the jaws 70 and 71 of the chuck. Note also that as soon as the rod 115 begins its sliding downward movement, the hinge portion 120 is disengaged from the finger 110 at the end of the rod 108 and the spring 123 yieldingly moves the member 120 inwardly towards the socket so that it yieldingly grasps the blank in the socket.

Now, although the rod 115 has reached its lowermost limit, the piston 129 continues to move so that the plate 130 slides downwardly against the action of the spring 131. This causes the studs 134 on the lever 132 to slide to the right along the slot 135. The lever is thus pivoted so that its lower end with the stud 136 swings to the left in FIG. 7. This moves the plunger 125 to the left and its head 126 engages the blank in the socket and moves it into the jaws of the chuck. The action is rapid and is completed with a snap. Note that while the rod 115 is sliding downwardly and forwardly towards the chuck its upper edge is effectively blocking any further movement from the chute 45. Now as the rod 115 is withdrawn, its socket portion 119 again reaches the bottom of the chute just as the member 120 and its finger 121 engages the finger 110 at the bottom of the chute thus opening the socket and allowing the next blank to enter the socket.

Simultaneously, as the piston 129 withdraws, the stud 134 is moved to the left in the slot 135, causing the lever 132 to pivot and withdrawing the plunger 125 and head 126. The frame 138 which supports the cylinder 128 is provided with a guide rod 139 attached to the outer or right end of the plate 130 as shown in FIG. 7. This guide rod may be provided with an actuating head 140 designed to trip a microswitch 141 to initiate the operation of the machine after the blank has been inserted into the jaws. It should be noted at this point that all the operations of the machine may be made automatic and in sequence by the insertion of simple switch arrangements so that on the completion of one operation the next one starts. For example, the chuck actuating mechanism 41 hereinabove described may be provided with the proper tripping switches for other operations after the opening and closing of the chuck as will be more fully hereinafter described.

Now referring to FIGS. 1 to 5 inclusive, this illustrates the operative mechanism for the tool which either reams or threads the inside of the blanks 20 or 29. The mechanism is supported in a housing 142. Extending rearwardly from the housing 142 is a small pulley housing 143, see FIG. 3, having an integral rearwardly extending hollow portion 144. The drive wheels 145 are mounted on spaced bearings 146 on the outside of the portion 144. Extending rearwardly from the drive wheels 145 is a conical portion 147 which engages the splined end of the spindle 148. The wheels 145 are belt driven and rotation of the wheels on the bearings 146 will cause the conical portion 147 to similarly rotate the spindle 148. However, the splined end of the spindle 148 permits sliding movement of the spindle axially while it is being rotated by the conical portion 147. To perform the various operations such as threading or reaming through the interior of the chuck, only a limited axial movement of the spindle is necessary. A distance of two inches is sufficient to provide the necessary movement for practically any size coupling.

The spindle 148 is hollow and the conventional draw bar 149 extends through it. As can be seen in FIG. 6, the spindle 148 terminates in the chuck in a tapered tool receiving portion and the draw bar 149 also terminates in the tapered portion.

Figure 4:
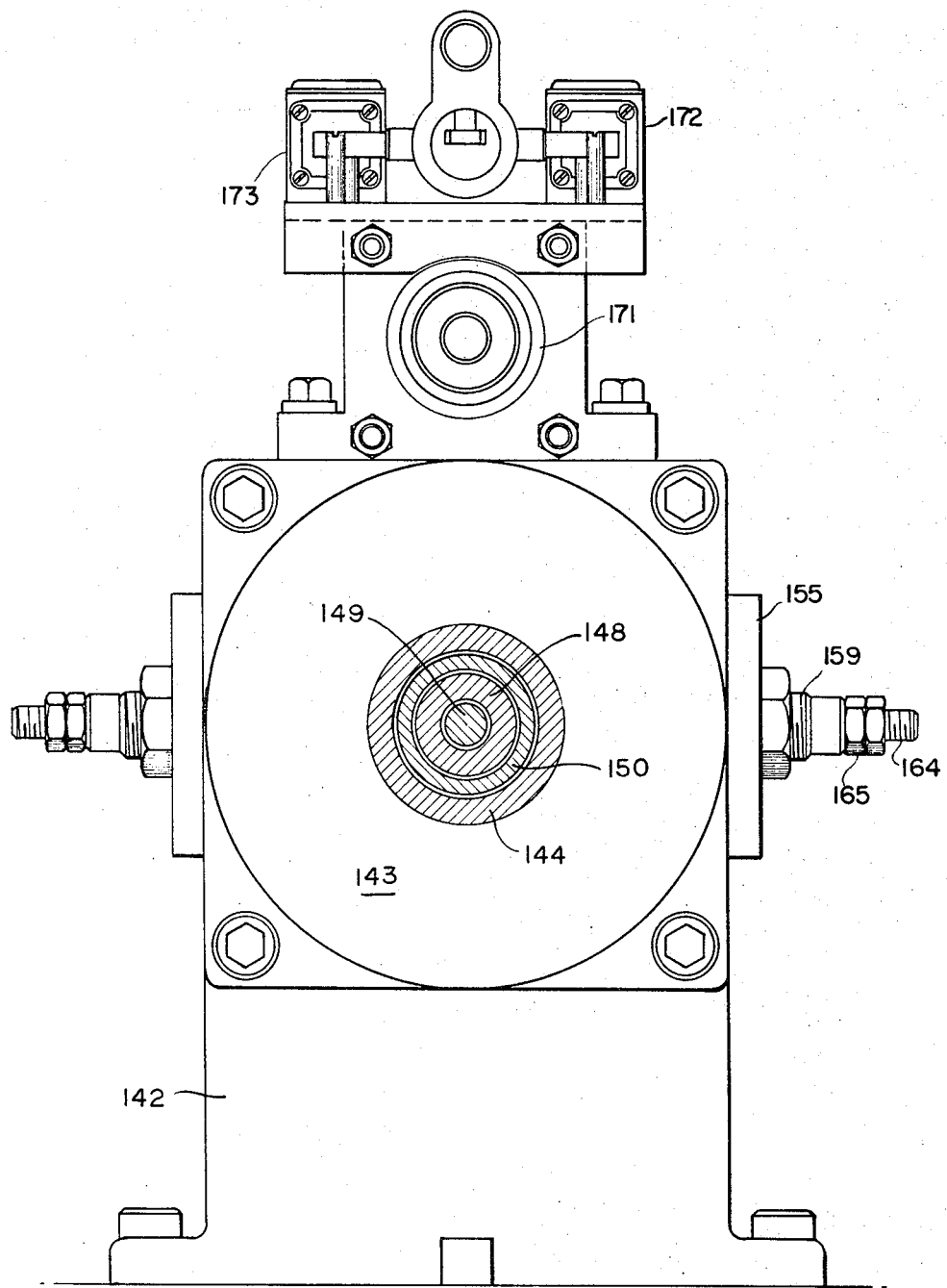
FIG. 4 is a section taken on line 4—4 on FIG. 3.
Figure 5:
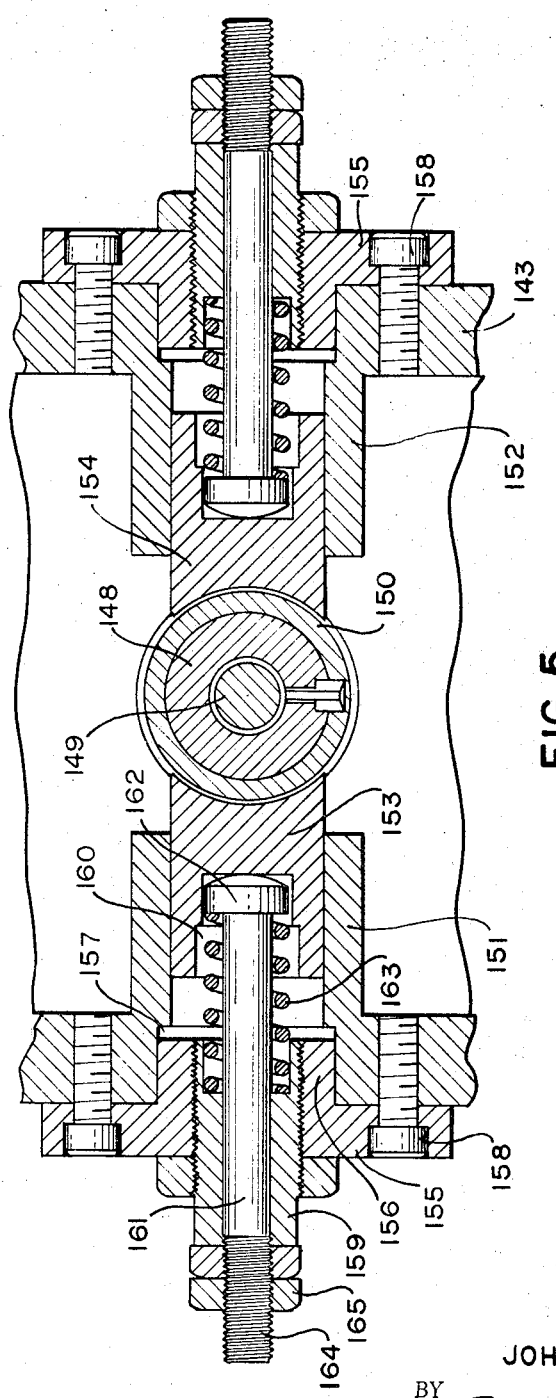
FIG. 5 is a section taken along line 5—5 on FIG. 3.

Reciprocation of the spindle and draw bar axially is accomplished by the lead screw device mounted on the spindle just forward of the splined end. Referring to FIGS. 3 and 5, a hollow lead screw 150 is mounted on the spindle 148, extending through the hollow housing portion 144 and the pulley housing 143. Extending inwardly from each side of the housing wall 143 is a short sleeve 151 and 152 axially aligned and each short of the spindle and its associated lead screw. Slidably mounted in the sleeve 151 is a block 153 and slidably mounted in the sleeve 152 is a block 154. The opposed ends of the blocks 153 and 154 are arcuate and designed to embrace the opposite sides of the lead screw 150 as shown in FIG. 5. The arcuate surfaces of the blocks 153 and 154 are threaded to correspond to the threads of the lead screw 150. Mounted on the outside of the housing 143 outside of each sleeve portion 151 and 152 is a plate 155 carrying a central sleeve 156 adapted to seat in a wider portion 157 of the sleeve 151 to restrict the same. The plates 155 are bolted to the housing 143 at 158.

The inside of each sleeve portion 156 is threaded and a tubular follower 159 is externally threaded to fit into the sleeve 156. The back end of each block 153 is provided with a socket opening 160. A rod 161 is slidably mounted in the follower 159 and is provided with an enlarged head 162 which enters the socket 160 of each block. A heavy coil spring 163 surrounds the rod 161 with one end abutting the enlarged head 162 and the other head abutting the rear end of the follower 159. The outer end of the rod 161 is threaded at 164 and is provided with suitable lock nuts 165. With this arrangement the spring 163 urges the head 162 of the rod 161 against the block 153 and presses the block against the lead screw so that the threads on the arcuate portion of the block 153 engage the threads on the lead screw 150. The tension of this engagement is regulated by moving the follower 159 along its threads either inwardly or outwardly to compress the spring 163. Inner movement of the rod 161 is regulated by the position of the lock screws 165. However, it should be noted that the rod 161 is free to move outwardly away from the block 153 against the action of the spring 163.

With the parts thus assembled, rotation of the spindle in one direction will cause the lead screw 150 in engagement with the blocks 153 to move the spindle 148 to the right in FIG. 3. The splined end of the spindle 148 will then slide towards the right. Reversal of the drive through the wheels 145 will similarly cause the lead screw and its associated spindle to move towards the left. The arrangement illustrated in FIG. 5 also serves the purpose of a safety construction. Assuming that something obstructs the movement of the spindle at the chuck, for example a breakage of a tool and a jamming of the parts, continued rotation of the drive wheels 145 and spindle 148 would normally result in the stripping of threads and the breakage of parts. However, with the arrangements illustrated in FIG. 5, the threads on the outer portion of the lead screw 150 and the ends of the blocks 153 will merely jump out and become disengaged against the action of the springs 163 allowing further rotation of the spindle without axial movement.

Now referring to FIGS. 2 and 3, movement of the spindle 148 and its associated lead screw 150 is controlled by the construction illustrated therein. A sleeve 166 is mounted in the housing 142 for axial movement on bearings 167. Each end of the sleeve 166 is provided with an enlarged portion 168 of larger internal diameter forming stop shoulders. At one end the lead screw 150 extends into bearings in these stop shoulders, and at the other end the extension of the spindle 148 is against the stop shoulders. A narrower portion of the spindle 148 passes freely through the sleeve 166. This permits rotation of the lead screw 150 and the spindle 148 carrying the sleeve 166 axially with them without causing rotation of the sleeve 166.

Mounted on top of the sleeve 166 is a support 169 extending upwardly through a slot 170 in the housing 142, permitting free movement of the support 169 with the sleeve 166. Mounted on the housing 142 in axial alignment with the support 169 is a cylinder 171, and mounted on top of the cylinder 171 are spaced microswitches 172 and 173. A rod 174 extends vertically from the support 169 and is provided with a horizontal bar 175 which reciprocates between the microswitches 172 and 173 as shown in FIG. 2. Mounted on the bar 175 are a pair of spaced adjustable collars 176 and 177. The collars 176 and 177 are axially adjustable to any desired position. The collars 176 and 177 are designed to contact the tripping mechanisms for the switches 172 and 173 respectively as they go by. For example, viewing FIG. 2, the collar 177 is of such diameter that it will pass by the tripping device 178 for the switch 172 and contact the tripping device 179 for the switch 173. This causes reverse movement of the motor and reverse movement of the bar 175. Now when the collar 176 passes by the tripping device 179 it operates the switch 173 and reverses the movement in the opposite direction. Therefore, with the proper positioning of the distance between the collars 176 and 177, axial movement or reciprocation of the spindle 148 can be controlled.

Now, if it is desired to provide a reaming action which does not require reverse movement of the spindle 148 but only a reciprocation, the followers 159, see FIG. 5, are unscrewed until the pressure of the springs 163 is off the blocks 153 permitting the withdrawal of the blocks and disengagement of the threads of the blocks against the lead screw 150. Simultaneously the piston 180 of the cylinder 171 is attached to the top portion of the support 169. Now the piston 171 is set for reciprocation, moving the support 169 backwards and forwards in its slot 170. This carries the sleeve 166 which in turn forces the spindle 148 into axial reciprocation in view of the shoulders at the points 168 at each end. The microswitches 172 and 173 may be hooked into the control of the cylinder 171 to provide for its reciprocation. Thus the mechanism illustrated in FIGS. 2, 3 and 5 may be used with a thread cutting tool for not only reciprocating the spindle but rotating it first in one direction and then in the other direction, and it can also be used for a reaming tool in which case the spindle is rotated in one direction only and the cylinder 171 is used for its axial reciprocation.

While the illustration in FIGS. 2 to 5 inclusive is specifically directed to the drive 42 for driving the tool through the chuck, the substantially identical construction applies to the drive 43 for the tools in front of the chuck. The drive 43 extends through a conical portion 181 similar to the portion 147 at the rear. The threaded blocks similar to the blocks 153 and 154 are regulated from the outside at 182. The shaft 183 is shown forwardly extended in the view in FIG. 1 and any desired tool may be attached at this point. Movement of this tool is controlled in a manner similar to the rear spindle 148. A cylinder 184 is mounted on top of the housing 44. The cylinder 184 is provided with a piston 185 which moves a vertical plate 186 mounted on a collar supporting the shaft 183. At the upper end the plate 186 is provided with a control rod 187 which passes between the control microswitches 188 as in the form shown in FIGS. 2 and 3.

The above construction thus permits the tooling in the front to operate similarly to the tooling in the rear except that the tooling in the rear passes through the chuck and into the coupling whereas the tooling from the front can be made to grind or to form threads externally of the union.

Referring to FIG. 1, the tool and tool holder to the left of the front of the chuck is illustrated plainly therein at 47. This comprises a base 189 on which are mounted spaced parallel blocks 190. Only one of the blocks 190 is visible in FIG. 1. Each block 190 is provided with a V-shaped cut out groove 191. An inverted U-shaped support 192 is mounted with its vertical walls resting on a triangular side bar 193 each slidably mounted in the groove 191 in the blocks 190. This permits sliding movement of the U-shaped support 192 at right angles to the axis of the chuck so that it moves towards or away from the center of the chuck where the union is being held between the jaws. Mounted on top of the support 192 is a rectangular block 194 which is the tool holder. The block 194 is mounted with a longitudinal rectangular groove 195 for positioning the tool in proper alignment.

Reciprocation of the support 192 and the block 194 and the tool carried thereby is provided by the mechanism mounted beneath the U-shaped support 192. A cylinder 196 is provided with its piston attached so that it moves the support 192 in reciprocation along its grooved supports. Extending from the cylinder 196 is the adjusting rod 197 for adjusting the stroke of the cylinder. Mounted on top of the cylinder 196 are a pair of spaced microswitches 198. A rod 199 extends from beneath the support 192 and reciprocates between the microswitches to alternately trip one or the other in a manner similar to the construction illustrated in FIGS. 2 and 3. This controls the movement of the tool holder and its tool toward or away from the work.

Figure 8:
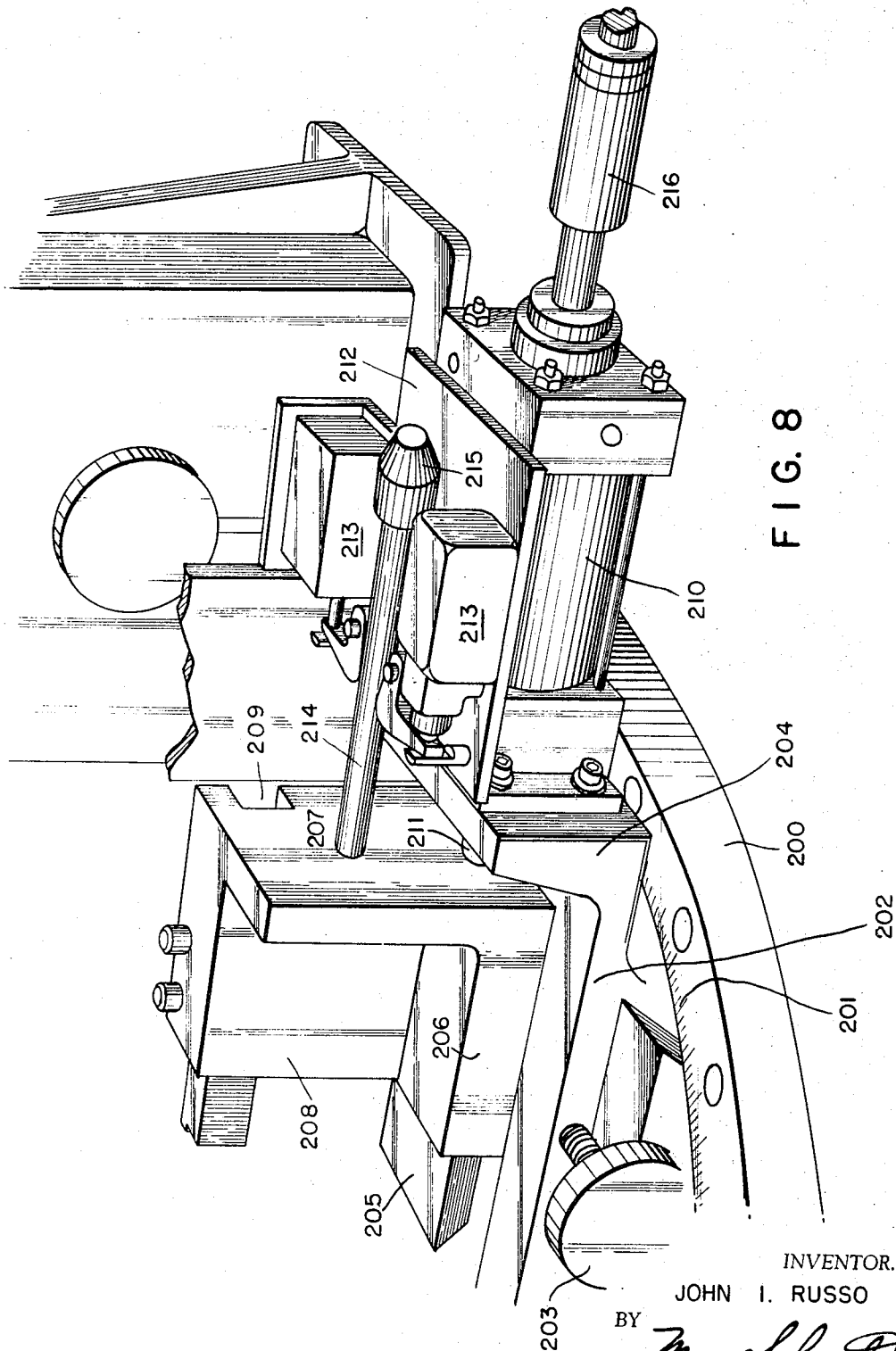
FIG. 8 is a perspective view of the angular tool mount at one side of the chuck.

Opposite the hereabove described tool holder arrangement 47, is a second tool and tool holder designed to slide inwardly and outwardly in alignment with the tool holder 194. This is mounted on the opposite side of the machine and is better illustrated in FIG. 8. Mounted on the table 38 is an arcuate rail 200 of rectangular cross section. The inner upper edge of the rail 200 is provided with graduations at 201. Mounted in the center of the radius of the rail 200 is a block 202 which is pivotally mounted and which can be locked on its pivot by the manually operated screw 203. The back end of the block 202 is provided with an integral vertical rectangular wall 204 which overhangs the rail 200 and whose side can be used to register on the graduations the exact angular position of the block 202. Mounted on the block 202 is a keystone block 205. The tool holder is provided with a bottom portion 206 having a keyway into which the keystone block 205 fits so that the tool holder can reciprocate along the block 205. The tool holder is provided with a vertical integral rear wall 207, and an integral side wall 208 on the side adjacent the chuck. The outer portion of the side wall 208 is provided with a rectangular groove 209 in which the tool is mounted.

Extending rearwardly from the vertical wall 204 of the block 202 is a hydraulic cylinder 210 having a piston 211 which extends through the wall 204 and is attached to the rear wall 207 of the tool holder. Reciprocation of the piston in the cylinder 210 will cause reciprocation of the tool holder along its keyway block 205. Mounted on top of the cylinder 210 is a plate 212 on which are spaced parallel microswitches 213. A rod 214 extends from the vertical wall 207 between the microswitch controls and is provided at its outer end with an enlarged head 215 for tripping the microswitches in its reciprocation. This again is a similar control mechanism to that illustrated in FIGS. 2 and 3. The length of the stroke of the piston in the cylinder 210 is controlled by the device 216 extending from the rear of the cylinder. This arrangement permits the tool to be swung at an angle to the union held in the jaws of the chuck so that the tool can enter the device at an angle and provide the necessary internal chamfer.

Now referring again to the drawings in conjunction with the union parts 20 and 29 as illustrated in FIGS. 9 to 14 inclusive, the blanks 20 are positioned in the chute 45 illustrated in FIG. 1 and held in proper position between the rods 107, 108 and 109. The lowermost blank drops into the socket portion 119 on the feed device illustrated in FIG. 7. The device slides downwardly towards the chuck, the member 120 swinging inwardly with the spring 123 to hold the blank in position. At its lowermost position, the plunger 125 and its head 126 moves laterally engaging the blank 20 and pushing it between the jaws 70 and 71 of the chuck.

At this point, the mechanism illustrated in FIG. 6 causes the jaws of the chuck to move towards each other and firmly grip the blank 20. The blank 20 is designed to make the tail or socket portion of the union. The chuck will now begin to rotate, and the front tool 47, illustrated in FIG. 1, will slide inwardly at right angles to the axis of the chuck and machine the surface 24 as in FIG. 10. Simultaneously, the rear sliding tool shown in FIG. 8 will move inwardly at the proper angle to produce the bevelled or chamfered surface 26 also shown in FIG. 10. Both tools now retract and the chuck stops rotating. Now the rear and front spindles 148 and 183 drive inwardly, the rear illustrated in FIGS. 2 to 5 inclusive moving inwardly within the chuck as shown in FIG. 6 and producing the threads 28 shown in FIG. 11. Alternatively, as hereinabove described, the same mechanism may be used to provide a reamed internal surface for sweating. The front spindle construction also slides forward simultaneously and produces the outer threads 27. The jaws of the chuck now open and the part drops downwardly and a new blank 20 is fed into the jaws of the chuck.

Where the swivel or ball portion of the union is being formed, the machine is programmed slightly differently. The blanks 29 shown in FIG. 12 are fed into the jaws of the chuck identically to the blank 20 shown in FIG. 9. The chuck does not rotate during the initial operation. The back spindle drive mechanism 42 moves inwardly and forms the threads 34 or reams the inside. The front spindle moves inwardly and roughs out the ball portion 32 and the diameter at the portion 31. After a retraction of the front and rear spindle members, the chuck begins to rotate and the cross tools now move inwardly, one tool finishing the diameter 36 and the other finishing the diameter 37 and the ball 32.

It is thus possible to readily program the machine of the present invention to make either portion of the union with the proper tooling and sequence of operation. With conventional electrical controls and microswitches, the sequence of operation can thus be set up so that when one part finishes the next one begins. However, it is desirable that each portion of the operation be manually controllable with suitable individual switches. The present invention eliminates a great deal of intermediate handling of the blanks so that once a rough blank is positioned in the chute no further handling is required and a finished product comes from the machine. The operation is rapid and production is greatly increased.

The lead screw construction illustrated in FIG. 5, which is used on both the front and rear drives 42 and 43 prevents major damage to the machine. In the event of a defective blank or broken tool or any other emergency which may clog the chuck and prevent forward movement of the spindles, continued driving merely causes the blocks 153 and 154 to jump their screw threads against the action of the following springs thus preventing any breakage. Variations in the size of the union can be handled by changing the chute 45 to accommodate the larger or smaller sizes and by adjusting the position of the tools. Furthermore, any of the operational sequences may readily be omitted if desired. The machine of the present invention is thus highly versatile and easily adaptable for other related types of sequential machining operations. Other advantages of the present invention will be readily apparent to a person skilled in the art.

I claim:

1. A machine for making pipe unions from rough blanks comprising a base, a housing mounted on said base, a chuck rotatably mounted in front of said housing, means for rotating said chuck, a support mounted on said base behind said housing, a spindle mounted in said support and extending through said housing to said chuck, means for rotating said spindle, means for axially reciprocating said spindle to carry a tool into and out of a blank hold in said chuck, a support mounted on said base in front of said chuck, a spindle in said support in axial alignment with said chuck, means for rotating said front spindle, means for axially reciprocating said front spindle to carry a tool toward and away from a blank held in said chuck, a first tool holder mounted on said base to one side of said chuck, means for moving said first tool holder toward and away from a blank held in said chuck, a second tool holder mounted on said base on the side opposite said first tool holder, and means for moving said second tool holder toward and away from a blank held in said chuck.

2. A machine as in claim 1, in which there is means for successively feeding blanks into said chuck.

3. A machine as in claim 2, in which said feeding means includes a chute for holding a plurality of blanks fed into said machine.

4. A machine as in claim 3, in which a support is mounted on said housing, a pair of spaced rectangular frames are mounted on said support, said frames being axially aligned at an angle to the axis of said chuck, and three spaced rectangular rods are mounted in said frames in parallel to form a chute therebetween extending at an angle to the axis of said chuck.

5. A machine as in claim 2, in which said feeding means includes a support mounted on said base, a reciprocating bar mounted on said support, and a socket member at one end of said bar for holding a blank in front of said chuck, and means for pushing a blank from said socket member into said chuck.

6. A machine as in claim 2, in which said feeding means includes a support, an elongated housing mounted on said support at an angle to the axis of said chuck, a bar slidably mounted in said elongated housing, a hydraulic cylinder and piston for reciprocating said bar, said bar housing a socket portion for carrying a blank to the front of said chuck, a ram for pushing a blank from said socket into said chuck, and a cam operated plate movable by said piston for actuating said ram at the bottom of the reciprocating stroke of said bar.

7. A machine as in claim 5, in which said feeding means includes a chute for holding a plurality of blanks fed into said machine.

8. A machine as in claim 7, in which a support is mounted on said housing, a pair of spaced rectangular frames are mounted on said support, said frames being axially aligned at an angle to the axis of said chuck, and three spaced rectangular rods are mounted in said frames in parallel to form a chute therebetween extending at an angle to the axis of said chuck.

9. A machine as in claim 6, in which said feeding means includes a chute for holding a plurality of blanks fed into said machine.

10. A machine as in claim 9, in which a support is mounted on said housing, a pair of spaced rectangular frames are mounted on said support, said frames being axially aligned at an angle to the axis of said chuck, and three spaced rectangular rods are mounted in said frames in parallel to form a chute therebetween extending at an angle to the axis of said chuck.

11. A machine as in claim 1, in which said chuck comprises a cylindrical housing, a plate covering the front of said housing, a channel opening extending diagonally across said plate, and a pair of jaws slidably mounted in said channel to grip a blank therebetween.

12. A machine as in claim 1, in which said chuck is mounted on a hollow shank extending rearwardly into said housing, said shank being supported on spaced bearings in said housing, said spindle extending through said shank, a ring gear surrounding said shank, and a plurality of driven gears mounted in said housing and selectively engageable with said ring gear for driving and changing the speed of rotation of said chuck.

13. A machine as in claim 1, in which said chuck is provided with opposed jaws for holding a blank, a bell crank lever in said chuck for operating each jaw, an operating sleeve extending from said levers rearwardly through said housing over said spindle, the rear end of said sleeve having a collar, a lever pivotally mounted on said housing and having one end engaging said sleeve collar, and a pneumatic cylinder having a piston engaging the other end of said lever to reciprocate said sleeve and bell crank levers for operating the jaws of said chuck.

14. A machine as in claim 13, in which said chuck comprises a cylindrical housing having a front plate, said plate having a channel opening extending diagonally across, said jaws being slidably mounted in said channel opening.

15. A machine as in claim 13, in which said chuck is mounted on a hollow shank extending rearwardly into said housing, said shank being supported on spaced bearings in said housing, said spindle and sleeve extending through said shank, a ring gear surrounding said shank, and a plurality of driven gears mounted in said housing and selectively engageable with said ring gear for driving and changing the speed of rotation of said chuck.

16. A machine as in claim 1, in which said spindle mounted behind said housing is provided with a lead screw, a pair of blocks mounted on opposite sides of said lead screw, the front ends of said blocks being curved to fit said lead screw and having threads complementary to said lead screw threads, adjustable spring means urging said blocks against said lead screw, and means for rotating said spindle and associated lead screw.

17. A machine as in claim 1, in which said spindle mounted in front of said chuck is provided with a lead screw, a pair of blocks mounted on opposite sides of said lead screw, the front ends of said blocks being curved to fit said lead screw and having threads complementary to said lead screw threads, adjustable spring means urging said blocks against said lead screw, and means for rotating said spindle and associated lead screw.

18. A machine as in claim 16, in which said spindle mounted in front of said chuck is provided with a lead screw, a pair of blocks mounted on opposite sides of said lead screw, the front ends of said blocks being curved to fit said lead screw and having threads complementary to said lead screw threads, adjustable spring means urging said blocks against said lead screw, and means for rotating said spindle and associated lead screw.

19. A machine as in claim 1, in which there is means for positioning said second tool holder for movement toward and away from said chuck at an angle to the face of said chuck.

20. A machine as in claim 1, in which said second tool holder is mounted on a pivoted base having means for locking said tool holder at an angle to the face of said chuck.

21. A machine as in claim 16, in which a cylinder and reciprocating piston are mounted above said rear spindle, said spindle being connected to said piston, said blocks being retractible from said lead screw and said cylinder being activated to provide a reciprocating reaming action of said spindle.

22. A machine as in claim 17, in which a cylinder and reciprocating piston are mounted above said front spindle, said spindle being connected to said piston, said blocks being retractible from said lead screw and said cylinder being activated to provide a reciprocating reaming action of said spindle.

23. A machine as in claim 11, in which there is means for successively feeding blanks into said chuck.

24. A machine as in claim 23, in which said feeding means includes a chute for holding a plurality of blanks fed into said machine.

25. A machine as in claim 24, in which a support is mounted on said housing, a pair of spaced rectangular frames are mounted on said support, said frames being axially aligned at an angle to the axis of said chuck, and three spaced rectangular rods are mounted in said frames in parallel to form a chute therebetween extending at an angle to the axis of said chuck.

26. A machine as in claim 23, in which said feeding means includes a support mounted on said base, a reciprocating bar mounted on said support, and a socket member at one end of said bar for holding a blank in front of said chuck, and means for pushing a blank from said socket member into said chuck.

27. A machine as in claim 23, in which said feeding means includes a support, an elongated housing mounted on said support at an angle to the axis of said chuck, a bar slidably mounted in said elongated housing, a hydraulic cylinder and piston for reciprocating said bar, said bar having a socket portion for carrying a blank to the front of said chuck, a ram for pushing a blank from said socket into said chuck, and a cam operated plate movable by said piston for actuating said ram at the bottom of the reciprocating stroke of said bar.

28. A machine as in claim 12, in which there is means for successively feeding blanks into said chuck.

29. A machine as in claim 28, in which said feeding means includes a chute for holding a plurality of blanks fed into said machine.

30. A machine as in claim 29, in which a support is mounted on said housing, a pair of spaced rectangular frames are mounted on said support, said frames being axially aligned at an angle to the axis of said chuck, and three spaced rectangular rods are mounted in said frames in parallel to form a chute therebetween extending at an angle to the axis of said chuck.

31. A machine as in claim 28, in which said feeding means includes a support mounted on said base, a reciprocating bar mounted on said support, and a socket member at one end of said bar for holding a blank in front of said chuck, and means for pushing a blank from said socket member into said chuck.

32. A machine as in claim 28, in which said feeding means includes a support, an elongated housing mounted on said support at an angle to the axis of said chuck, a bar slidably mounted in said elongated housing, a hydraulic cylinder and piston for reciprocating said bar, said bar having a socket portion for carrying a blank to the front of said chuck, a ram for pushing a blank from said socket into said chuck, and a cam operated plate movable by said piston for actuating said ram at the bottom of the reciprocating stroke of said bar.

33. A machine as in claim 13, in which there is means for successively feeding blanks into said chuck.

34. A machine as in claim 33, in which said feeding means includes a chute for holding a plurality of blanks fed into said machine.

35. A machine as in claim 34, in which a support is mounted on said housing, a pair of spaced rectangular frames are mounted on said support, said frames being axially aligned at an angle to the axis of said chuck, and three spaced rectangular rods are mounted in said frames in parallel to form a chute therebetween extending at an angle to the axis of said chuck.

36. A machine as in claim 33, in which said feeding means includes a support mounted on said base, a reciprocating bar mounted on said support, and a socket member at one end of said bar for holding a blank in front of said chuck, and means for pushing a blank from said socket member into said chuck.

37. A machine as in claim 33, in which said feeding means includes a support, an elongated housing mounted on said support at an angle to the axis of said chuck, a bar slidably mounted in said elongated housing, a hydraulic cylinder and piston for reciprocating said bar, said bar having a socket portion for carrying a blank to the front of said chuck, a ram for pushing a blank from said socket into said chuck, and a cam operated plate movable by said piston for actuating said ram at the bottom of the reciprocating stroke of said bar.

38. A machine as in claim 16, in which said chuck comprises a cylindrical housing, a plate covering the front of said housing, a channel opening extending diagonally across said plate, and a pair of jaws slidably mounted in said channel to grip a blank therebetween.

39. A machine as in claim 16, in which said chuck is mounted on a hollow shank extending rearwardly into said housing, said shank being supported on spaced bearings in said housing, said spindle extending through said shank, a ring gear surrounding said shank, and a plurality of driven gears mounted in said housing and selectively engageable with said ring gear for driving and changing the speed of rotation of said chuck.

40. A machine as in claim 13, in which said spindle mounted behind said housing is provided with a lead screw, a pair of blocks mounted on opposite sides of said lead screw, the front ends of said blocks being curved to fit said lead screw and having threads complementary to said lead screw threads, adjustable spring means urging said blocks against said lead screw, and means for rotating said spindle and associated lead screw.

41. A machine as in claim 17, in which said chuck comprises a cylindrical housing, a plate covering the front of said housing, a channel opening extending diagonally across said plate, and a pair of jaws slidably mounted in said channel to grip a blank therebetween.

42. A machine as in claim 17, in which said chuck is mounted on a hollow shank extending rearwardly into said housing, said shank being supported on spaced bearings in said housing, said spindle extending through said shank, a ring gear surrounding said shank, and a plurality of driven gears mounted in said housing and selectively engageable with said ring gear for driving and changing the speed of rotation of said chuck.

43. A machine as in claim 13, in which said spindle mounted in front of said chuck is provided with a lead screw, a pair of blocks mounted on opposite sides of said lead screw, the front ends of said blocks being curved to fit said lead screw and having threads complementary to said lead screw threads, adjustable spring means urging said blocks against said lead screw, and means for rotating said spindle and associated lead screw.

44. A machine as in claim 11, in which there is means for positioning said second tool holder for movement toward and away from said chuck at an angle to the face of said chuck.

45. A machine as in claim 12, in which there is means for positioning said second tool holder for movement toward and away from said chuck at an angle to the face of said chuck.

46. A machine as in claim 13, in which there is means for positioning said second tool holder for movement toward and away from said chuck at an angle to the face of said chuck.

47. A machine as in claim 11, in which said second tool holder is mounted on a pivoted base having means for locking said tool holder at an angle to the face of said chuck.

48. A machine as in claim 12, in which said second tool holder is mounted on a pivoted base having means for locking said tool holder at an angle to the face of said chuck.

49. A machine as in claim 13, in which said second tool holder is mounted on a pivoted base having means for locking said tool holder at an angle to the face of said chuck.

50. A machine as in claim 38, in which there is means for positioning said second tool holder for movement toward and away from said chuck at an angle to the face of said chuck.

References Cited

UNITED STATES PATENTS 1,762,649   6/1930   Andrews _____ 10—87

HARRISON L. HINSON, *Primary Examiner*